E. M. STEPHENS.
FUSIBLE LINK.
APPLICATION FILED APR. 17, 1912.
1,069,201.
Patented Aug. 5, 1913.
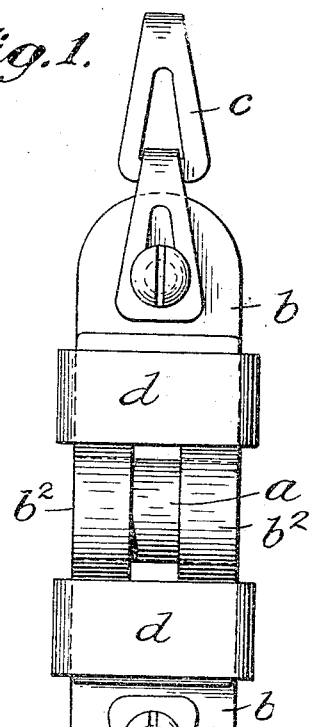
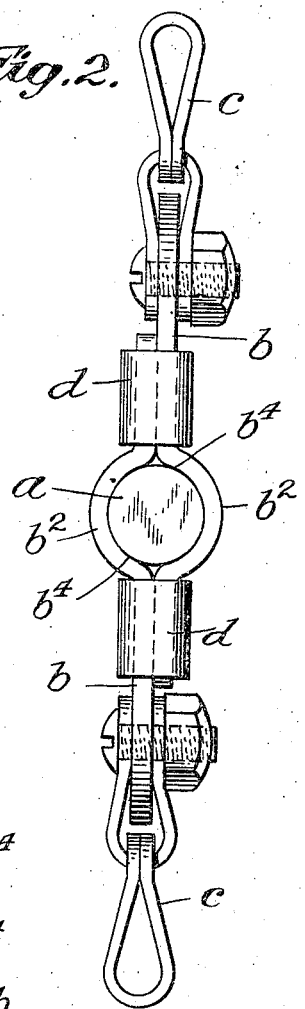
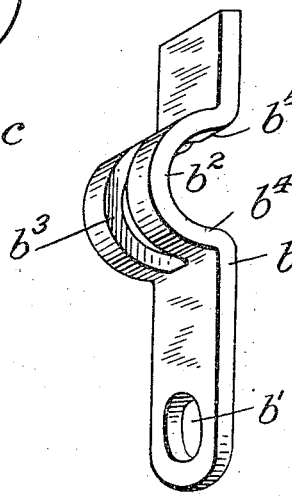
Attest:
Inventor:
Edward M. Stephens
by Redding & Greeley Att'ys

UNITED STATES PATENT OFFICE.

EDWARD M. STEPHENS, OF RICHMOND HILL, NEW YORK.

FUSIBLE LINK.

1,069,201.   Specification of Letters Patent.   Patented Aug. 5, 1913.

Application filed April 17, 1912. Serial No. 691,387.

*To all whom it may concern:*

Be it known that I, EDWARD M. STEPHENS, a citizen of the United States, residing in Richmond Hill, Queens county, State of New York, have invented certain new and useful Improvements in Fusible Links, of which the following is a specification, reference being had to the accompanying drawing, which forms a part hereof.

This invention relates to devices such as are employed for the purpose of holding fire-doors, or fire-windows and for other purposes and are designed to part under the influence of heat in order to effect the release of the door, window or other thing held from movement before the giving way of the link. These devices are frequently subject to a strain which is both continuous and considerable and as the fusible solder which enters into the structure of the link is usually under tension and is not well adapted, even when cold, to resist tension, it frequently happens that the links part under the influence of the strain without substantial rise of temperature and therefore permit the movement of the door, window or other thing at a time when such movement is not desired.

In accordance with this invention the fusible solder, or at least a portion of it, is placed under compression and the link is therefore capable of enduring not only a much greater strain but a great strain for a much longer time than is the case when the fusible solder is under tension only. The link is so formed that its two parts or members, when subjected to strain, tend to compress between them a body of fusible solder which may or may not be itself soldered to such members or either of them.

The invention will be more fully explained hereinafter with reference to the accompanying drawing in which, for purposes of explanation of the character of the invention, is illustrated one form of link in which the invention may be embodied.

In the drawing Figure 1 is a view in face elevation and on a somewhat exaggerated scale of a fusible link which embodies the invention. Fig. 2 is a view of the same in edge elevation. Fig. 3 is a detail view in perspective of one of the members of the link.

The link shown in the drawing comprises a body $a$ of easily fusible solder and two members $b$, to which the chains $c$ or other parts which are to be held together by the link before fusion of the solder may be attached or connected. The two members $b$ are so formed as to place the body of solder $a$ under compression when the whole device is in use and under strain. In the construction shown the whole device is assumed to be under a pulling strain, but obviously the device might be so placed and connected that the strain would tend to push the members toward each other. In either case, even in the construction shown, the body $a$ of fusible solder is under compression and the members $b$ are so formed that they may separate completely when the key $a$ of solder fuses. Each member $b$, as shown, is formed of a flat bar of any suitable material, with an eye $b'$ at one end for connection with the chain $c$ or other part and with a half loop $b^2$, which may be slotted as at $b^3$ to expose more of the surface of the fusible solder $a$. The two members $b$ are placed together, face to face, as shown in Fig. 2, so that they form a complete loop or a substantially complete loop in which is placed a key $a$ of fusible solder, opposite shoulders $b^4$ of the members $b$ bearing upon the solder key $a$ at opposite points. It will now be seen that relative longitudinal movement of the two members in either direction places the key $a$ of fusible solder under compression and that separation of the two members, by longitudinal movement in either direction, is not possible until the solder is fused. Means are provided for preventing separation of the two members by any other movement. Obviously the solder $a$ might itself be soldered to the two members or the two members might be soldered together so as to prevent accidental separation, but in the construction shown ferrules $d$ are slipped upon the parallel portions of the two members so as to prevent separation except by relative longitudinal movement. These two ferrules may be freely slidable with respect to the members $b$ or they may themselves be secured in position against accidental displacement by being fusibly soldered to the members $b$. In accordance with another construction each ferrule may be permanently soldered to that portion of its respective member $b$ which is nearest the point of connection to the chain $c$ and, if desired, fusibly soldered to the end of the other member $b$.

Various other embodiments of the invention will readily suggest themselves and it is to be understood that the invention is not restricted to the particular structure shown.

I claim as my invention:—

1. A fusible link comprising two members with reversely formed shoulders, means to prevent separation of said members by movement in any direction other than longitudinal and a key of fusible solder interposed between said shoulders in the line of stress to which the link is subjected when in use.

2. A fusible link comprising two members with reversely formed loops, means to prevent separation of said members by movement in any direction other than longitudinal and a key of fusible solder placed in said loops in the line of stress to which the link is subjected when in use.

3. A fusible link comprising two relatively movable members with reversely formed shoulders, a key of fusible solder interposed between said shoulders and subject to compression by relative movement of said members in a longitudinal direction, and means to prevent separation of said members by movement in any other direction.

4. A fusible link comprising two relatively movable members with reversely formed loops, a key of fusible solder placed in said loops and subject to compression by relative movement of said members in a longitudinal direction, and means to prevent separation of said members by movement in any other direction.

5. A fusible link comprising two relatively movable members with opposite shoulders, a key of fusible solder interposed between said shoulders and subject to compression by relative movement of said members in a longitudinal direction, and a ferrule embracing said members to prevent separation thereof in any other direction.

6. A fusible link comprising two relatively movable members with opposing loops and parallel portions, a key of fusible solder placed in said loops and subject to compression by relative movement of said members in a longitudinal direction, and a ferrule embracing the parallel portions of the members to prevent separation thereof in any other direction.

This specification signed and witnessed this 15th day of April A. D., 1912.

EDWARD M. STEPHENS.

Signed in the presence of—
ROBERT S. BEATTY,
ALEXANDER FROMHOLD.